United States Patent Office 3,424,589
Patented Jan. 28, 1969

3,424,589
PROCESS FOR AGGLOMERATING COFFEE
Billy Kan, Scarsdale, and Saul N. Katz, Yonkers, N.Y., assignors to General Foods Corporation, a corporation of Delaware
No Drawing. Filed Feb. 21, 1966, Ser. No. 528,770
U.S. Cl. 99—71
Int. Cl. A23f 1/08
4 Claims

ABSTRACT OF THE DISCLOSURE

Strong, fused agglomerates of soluble coffee particles are formed by adding sufficient moisture to porous agglomerates to lower the thermoplastic point of the coffee at the contact points to a level which will not degrade the essential coffee flavor but insufficient to dissolve said contact points, and heating the agglomerates to above the thermoplastic point of the coffee during drying to obtain a fused agglomerate.

---

This invention relates to the agglomeration of coffee and, more particularly, to producing stronger and denser agglomerates of coffee.

It has been desirable to agglomerate soluble coffee in order to lower the bulk density of the coffee as well as to change the physical appearance and rehydration properties of the coffee. However, prior art agglomerates have a serious disadvantage in that the particles of coffee which make up each agglomerate are connected by relatively weak bonds which break or fall apart under commercial handling conditions. This appears to be due to the nature of previous agglomeration processes for coffee. During agglomeration, the degree of wetting of the coffee has been controlled in order to avoid an excess dissolution of coffee solids during the agglomeration operation. Also, the use of high drying temperatures which tend to melt the product has been avoided. Melting has been viewed as undesirable since this leads to poor agglomerates being formed due to sticking of agglomerates to each other, plastering of the chamber walls, and damage to the essential coffee flavor. At the prior art temperatures and moisture conditions it is possible to form large and fluffy agglomerates. However, due to the random contact only small surface portions of the wet coffee particles adhere to one another in the form of a dissolved dilute coffee solution at the contact points. These contact points on drying leave only a dried solution of dilute coffee solids thus forming weak bonded agglomerates.

It is a principal object of this invention to produce denser agglomerates of soluble coffee which are held together by strong, thick bonds of melted or fused coffee solids.

Another object of this invention is to change the particle appearance of instant coffee and provide an instant coffee which has a more granular appearance.

Still another object of this invention is to avoid flavor degradation of the soluble coffee during the fusion step.

These and other objects and advantages of the present invention over the prior art will appear from the following description of the invention.

This invention is founded on the discovery that strong, fused agglomerates of soluble coffee particles having the flavor of the initial soluble coffee can be formed by moistening said coffee to a point which renders the particles sticky, contacting said sticky particles to form agglomerates, adding sufficient moisture to said agglomerates to lower the thermoplastic point of the coffee at said contact points to a level which will not degrade the essential coffee flavor but insufficient to dissolve said contact points and then heating said moistened agglomerates to above the thermoplastic point of the coffee during drying to obtain a fused agglomerate.

As used in this invention, fusion is synonymous with melting, welding, cementing or coalescing of the coffee particles at the various contact points of these particles by raising the temperature of the coffee to above its thermoplastic point or that point where it will soften, melt, or become plastic due to the application of heat. The moisture present during fusion is necessary in order to lower the thermoplastic point of coffee to a point where the coffee will not be degraded due to excess heat. This should be distinguished from a mere dissolving of the coffee solids due to the application of moisture alone without the use of heat. Thus, it can be seen that the coffee particles which form the coffee aggregates or agglomerates of this invention are not connected by bonds formed by a dry solution of dilute coffee solids but instead are connected by bonds made of melted coffee solids which upon cooling fuse together in a manner analogous to a weld or fusion of two pieces of metal.

Operation of the process involves formation of moist coffee agglomerates at the critical moisture levels necessary for dry soluble coffee powder. Moisture addition is usually in the range of between 1% and 5% total moisture with the actual surface moisture at the critical bonding points being in the range fo 5–15%. Moisture addition to the coffee is preferably by steam condensation but can also be done by a water spray or by moistened warm air. Any moistening fluid may be used which releases moisture to the cool coffee particles to wet the surfaces of the particles, the wet particles then being agglomerated by contacting one another in a random particle to particle contact. Of course, the particles may be moistened and agglomerated in separate zones or in the same zone as long as the moist agglomerates once formed are not allowed to dry to a stable moisture level prior to being fused together.

Fusion of the moist coffee agglomerates may be done in several ways as long as sufficient moisture is present at the surface portions of the coffee particles to insure a low thermoplatic or fusion point at this area as compared to the more interior portions of the coffee particle. In other words, the moisture gradient throughout the coffee particle should never proceed to the point where the moisture at the surface is lower or more dry than the interior of the coffee particle *until* the coffee has been first allowed to fuse or melt at these surface positions. The reason for having a higher moisture level at the surface is to lower the thermoplastic point of the coffee at these points to a practical value which permits fusion and melting of the coffee at relatively low temperatures, e.g., 110°–150° F., preferably 130° F. While the fusion point will be lowered as the moisture is increased, excess moisture addition will cause an excess dissolution of coffee solids and this will cause a loss in the particle to particle agglomeration of the coffee thus giving a poor, nonuniform, or nonagglomerated product. An operable moisture range for fusion will be between 4% and 8% total moisture (giving a surface moisture of about 8–15%) and a product temperature of between 110° F. and 150° F.

The bulk density of the coffee is changed by this process by about 1 to 3 times. Coffee having an initial density of between 0.3 and 0.6 gm./cc. is changed to a bulk density of between 0.10 to 0.30 gm./cc.

This invention will now be described by reference to the following specific examples:

EXAMPLE I

Spray-dried instant coffee having a particle size distribution of between 12 and 100 mesh U.S. Standard Sieve, a bulk density of 0.35 gm./cc. and a moisture content of about 3% was agglomerated in a Blaw-Knox "Instantizer" according to the procedure and apparatus described in U.S. Patent No. 2,893,871 to H. L. Griffin (assigned to Blaw-Knox).

The coffee powder is fed from the vibratory feeder at the rate of about 200 pounds per hour, in a thin sheet-like stream about 6 inches wide and about ⅛ inch in thickness. The steam nozzles which are on centers 2 to 4 inches apart and have slit orifices about 7 inches long and 0.065 inch wide were directed downwardly at an angle of about 40° from the central vertical plane. The steam was supplied at a pressure of about 5 p.s.i.g. and a rate of about 60 pounds per hour. The coffee powder falling into the zone of turbulence where the two sheet-like jets collide was subjected to two actions. First a, moistening action or surface wetting due to condensation of the steam, and second, a tumbling or turbulent action whereby the wet particles contacted one another and adhered into the clusters or agglomerates.

The Blaw-Knox procedure was then altered as the agglomerates fell about 10 inches through the drier inlet into the drying chamber, which had a diameter of about 3 feet and a length of 8 feet. The moist agglomerates were maintained in a humid drying atmosphere by injecting steam into the drying air inlet at a top of the dryer at a rate of 150 pounds per hour. Inlet air temperature was between 270° F. and 310° F. giving a dry bulb temperature of about 180° F. and a wet bulb temperature of about 130° F. in the drying chamber. Usage of air was a rate of about 500 cubic feet per minute. The exhaust blower was not used. Residence time of the moist coffee in the humidified drying air was about ½ to 2 minutes and the fused agglomerates issued from the bottom of the dryer at a moisture of about 3%.

While this invention has been described by reference to a specific example, reference should be had to the appended claims for a proper definition of its scope.

What is claimed is:

1. A process for producing strong, fused agglomerates of soluble coffee particles having the flavor of the initial soluble coffee which comprises moistening said coffee to a point which renders the particles sticky, contacting said sticky particles to form agglomerates, adding sufficient moisture to said agglomerates to lower the thermoplastic point of the coffee at said contact points to a level which will not degrade the essential coffee flavor but insufficient to dissolve said contact points, and heating said moistened agglomerates to above the thermoplastic point of the coffee during drying to obtain a fused agglomerate.

2. The process of claim 1 wherein the coffee is initially moistened with between 1% and 5% moisture, agglomerates formed and said coffee heated to above the thermoplastic point to fuse the agglomerates while having at least 4% total moisture present in said coffee.

3. The process of claim 1 wherein the moist coffee agglomerates are fused at a product temperature of between 110° F. and 150° F. by having sufficient moisture present in the surface portions of the coffee particles to accomplish fusion at said temperatures.

4. The process of claim 1 wherein the fusion is accomplished by drying the moist agglomerates of coffee in humidified air having a wet bulb temperature of between 110° F. and 150° F.

References Cited

UNITED STATES PATENTS

| | | | |
|---|---|---|---|
| 2,893,871 | 7/1959 | Griffen | 99—56 |
| 2,897,084 | 7/1959 | Peebles | 99—71 |
| 3,093,488 | 6/1963 | Graham et al. | 99—199 |

MAURICE W. GREENSTEIN, *Primary Examiner.*

U.S. Cl. X.R.

99—199